United States Patent
Nelson et al.

(10) Patent No.: US 10,041,327 B2
(45) Date of Patent: Aug. 7, 2018

(54) DIVERTING SYSTEMS FOR USE IN LOW TEMPERATURE WELL TREATMENT OPERATIONS

(71) Applicant: Baker Hughes Incorporated, Houston, TX (US)

(72) Inventors: Scott G. Nelson, Cypress, TX (US); D. V. Satyanarayana Gupta, The Woodlands, TX (US); Anna Jensen, The Woodlands, TX (US); Dorianne Arlene Castillo, Humble, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 0 days.

(21) Appl. No.: 14/461,123

(22) Filed: Aug. 15, 2014

(65) Prior Publication Data
US 2014/0352959 A1 Dec. 4, 2014

Related U.S. Application Data

(63) Continuation-in-part of application No. 13/928,006, filed on Jun. 26, 2013, now Pat. No. 9,919,966.
(Continued)

(51) Int. Cl.
*E21B 43/267* (2006.01)
*E21B 43/14* (2006.01)
(Continued)

(52) U.S. Cl.
CPC .............. *E21B 33/138* (2013.01); *C09K 8/44* (2013.01); *C09K 8/508* (2013.01); *C09K 8/516* (2013.01);
(Continued)

(58) Field of Classification Search
CPC ... C09K 8/74; C09K 8/68; C09K 8/72; C09K 8/506; C09K 8/50; C09K 8/76;
(Continued)

(56) References Cited

U.S. PATENT DOCUMENTS 2,596,843 A 5/1952 Farris
2,735,269 A 2/1956 Carpenter et al.
(Continued)

FOREIGN PATENT DOCUMENTS

CA 2329834 A1 6/2002
EP 0308257 A2 3/1989
(Continued)

OTHER PUBLICATIONS

Chellappah "A new outlook on the idea I packing Theory for Bridging Solids" SPE 151636 Feb. 17, 2012.*
(Continued)

*Primary Examiner* — Angela M DiTrani
*Assistant Examiner* — Charles R Nold
(74) *Attorney, Agent, or Firm* — John Wilson Jones; JOnes Delflache LLP

(57) ABSTRACT

The flow of a fluid may be diverted from a high permeability zone to a low permeability portion of a subterranean formation by use of particulates comprising a mixture of (i) at least one aliphatic polyester having the general formula of repeating units:

(I)

(Continued)

where n is an integer between 75 and 10,000 and R is selected from the group consisting of hydrogen, alkyl, aryl, alkylaryl, acetyl, heteroatoms, and mixtures thereof; and (ii) at least one compound of the formula:

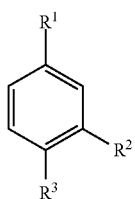

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
  provided both $R^2$ or $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$
$R^4$ is —H or a $C_1$-$C_6$ alkyl group;
$R^5$ is a $C_1$-$C_6$ alkylene group; and
each y is 0 to 5.

23 Claims, 1 Drawing Sheet

Related U.S. Application Data

(60) Provisional application No. 61/664,640, filed on Jun. 26, 2012.

(51) Int. Cl.
| | |
|---|---|
| *C09K 8/516* | (2006.01) |
| *C09K 8/508* | (2006.01) |
| *E21B 33/138* | (2006.01) |
| *C09K 8/536* | (2006.01) |
| *E21B 43/26* | (2006.01) |
| *C09K 8/44* | (2006.01) |
| *C09K 8/575* | (2006.01) |
| *C09K 8/68* | (2006.01) |
| *C09K 8/70* | (2006.01) |
| *C09K 8/72* | (2006.01) |
| *C09K 8/76* | (2006.01) |
| *C09K 8/88* | (2006.01) |
| *C09K 8/92* | (2006.01) |

(52) U.S. Cl.
CPC ............. *C09K 8/5751* (2013.01); *C09K 8/68* (2013.01); *C09K 8/70* (2013.01); *C09K 8/725* (2013.01); *C09K 8/76* (2013.01); *C09K 8/88* (2013.01); *C09K 8/92* (2013.01); *E21B 43/261* (2013.01)

(58) Field of Classification Search
CPC ... C09K 8/035; C09K 2208/18; E21B 33/138; E21B 43/26; E21B 43/261; E21B 33/13; E21B 43/04
See application file for complete search history.

(56) References Cited

U.S. PATENT DOCUMENTS

| | | |
|---|---|---|
| 2,966,457 A | 12/1960 | Starmann et al. |
| 3,089,542 A | 5/1963 | Kolodny |
| 3,127,937 A | 4/1964 | McGuire, Jr. et al. |
| 3,149,673 A | 9/1964 | Pennington |
| 3,149,674 A | 9/1964 | Schultze et al. |
| 3,151,678 A | 10/1964 | Hanson et al. |
| 3,159,217 A | 12/1964 | Hanson |
| 3,175,615 A | 3/1965 | East |
| 3,254,717 A | 6/1966 | Huitt et al. |
| 3,266,573 A | 8/1966 | Rixe |
| 3,335,796 A | 8/1967 | Parker, Jr. |
| 3,335,797 A | 8/1967 | Braunlich, Jr. |
| 3,372,752 A | 3/1968 | Prater |
| 3,399,727 A | 9/1968 | Graham et al. |
| 3,480,084 A | 11/1969 | Eilers |
| 3,492,147 A | 1/1970 | Young et al. |
| 3,497,008 A | 2/1970 | Graham et al. |
| 3,659,651 A | 5/1972 | Graham |
| 3,709,300 A | 1/1973 | Pye |
| 3,888,311 A | 6/1975 | Cooke, Jr. |
| 3,929,191 A | 12/1975 | Graham et al. |
| 3,937,283 A | 2/1976 | Blauer et al. |
| 3,954,142 A | 5/1976 | Broaddus et al. |
| 4,051,900 A | 10/1977 | Hankins |
| 4,074,760 A | 2/1978 | Copeland et al. |
| 4,078,609 A | 3/1978 | Pavlich |
| 4,078,610 A | 3/1978 | Arnold |
| 4,195,010 A | 3/1980 | McClinton et al. |
| 4,216,829 A | 8/1980 | Murphey |
| 4,421,167 A | 12/1983 | Erbstoesser |
| 4,439,489 A | 3/1984 | Johnson et al. |
| 4,444,264 A | 4/1984 | Dill |
| 4,462,466 A | 7/1984 | Kachnik |
| 4,493,875 A | 1/1985 | Beck |
| 4,502,967 A | 3/1985 | Conway |
| 4,506,734 A | 3/1985 | Nolte |
| 4,509,598 A | 4/1985 | Earl et al. |
| 4,547,468 A | 10/1985 | Jones et al. |
| 4,585,064 A | 4/1986 | Graham et al. |
| 4,632,876 A | 12/1986 | Laird et al. |
| 4,654,266 A | 3/1987 | Kachnik |
| 4,680,230 A | 7/1987 | Gibb et al. |
| 4,717,594 A | 1/1988 | Graham et al. |
| 4,733,729 A | 3/1988 | Copeland |
| 4,796,701 A | 1/1989 | Hudson et al. |
| 4,829,100 A | 5/1989 | Murphey et al. |
| 4,830,794 A | 5/1989 | Edgley et al. |
| 4,840,729 A | 6/1989 | Levine |
| 4,850,430 A | 7/1989 | Copeland et al. |
| 4,869,960 A | 9/1989 | Gibb et al. |
| 4,875,525 A | 10/1989 | Mana |
| 4,887,670 A | 12/1989 | Lord et al. |
| 4,888,240 A | 12/1989 | Graham et al. |
| 4,895,207 A | 1/1990 | Friedman |
| 4,921,820 A | 5/1990 | Rumpf et al. |
| 4,921,821 A | 5/1990 | Rumpf et al. |
| 4,923,714 A | 5/1990 | Gibb et al. |
| 4,969,523 A | 11/1990 | Martin et al. |
| 5,069,283 A | 12/1991 | MacK |
| 5,074,359 A | 12/1991 | Schmidt |
| 5,103,905 A | 4/1992 | Brannon et al. |
| 5,175,133 A | 12/1992 | Smith et al. |
| 5,240,654 A | 8/1993 | Smith et al. |
| 5,305,832 A | 4/1994 | Gupta et al. |
| 5,330,005 A | 7/1994 | Card et al. |
| 5,333,689 A | 8/1994 | Jones et al. |
| 5,422,183 A | 6/1995 | Sinclair et al. |
| 5,425,421 A | 6/1995 | Coleman et al. |
| 5,435,391 A | 7/1995 | Jones |
| 5,439,055 A | 8/1995 | Card |
| 5,443,633 A | 8/1995 | Hirsbrunner et al. |
| 5,492,178 A | 2/1996 | Nguyen |
| 5,501,273 A | 3/1996 | Puri |
| 5,515,920 A | 5/1996 | Luk |
| 5,531,274 A | 7/1996 | Bienvenu, Jr. |

(56) References Cited

U.S. PATENT DOCUMENTS

| | | |
|---|---|---|
| 5,547,506 A | 8/1996 | Rae et al. |
| 5,582,249 A | 12/1996 | Caveny et al. |
| 5,582,250 A | 12/1996 | Constein |
| 5,597,784 A | 1/1997 | Sinclair et al. |
| 5,604,184 A | 2/1997 | Ellis et al. |
| 5,699,860 A | 12/1997 | Grundmann |
| 5,799,734 A | 9/1998 | Norman et al. |
| 5,837,656 A | 11/1998 | Sinclair et al. |
| 5,908,073 A | 6/1999 | Nguyen et al. |
| 5,916,933 A | 6/1999 | Johnson et al. |
| 5,921,317 A | 7/1999 | Dewprashad et al. |
| 5,924,488 A | 7/1999 | Nguyen et al. |
| 5,948,734 A | 9/1999 | Sinclair et al. |
| 5,950,727 A | 9/1999 | Irani |
| 5,955,144 A | 9/1999 | Sinclair et al. |
| 5,960,878 A | 10/1999 | Nguyen et al. |
| 5,964,289 A | 10/1999 | Hill |
| 5,964,291 A | 10/1999 | Bourne et al. |
| 6,047,772 A | 4/2000 | Weaver et al. |
| 6,059,034 A | 5/2000 | Rickards et al. |
| 6,070,666 A | 6/2000 | Montgomery |
| 6,079,492 A | 6/2000 | Hoogteerjiling et al. |
| 6,114,410 A | 9/2000 | Betzold |
| 6,116,342 A | 9/2000 | Clark et al. |
| 6,138,760 A | 10/2000 | Lopez et al. |
| 6,169,058 B1 | 1/2001 | Le et al. |
| 6,172,011 B1 | 1/2001 | Card et al. |
| 6,194,355 B1 | 2/2001 | Jarrett et al. |
| 6,209,643 B1 | 4/2001 | Nguyen et al. |
| 6,211,120 B1 | 4/2001 | Welch et al. |
| 6,248,838 B1 | 6/2001 | Albright |
| 6,311,773 B1 | 11/2001 | Todd et al. |
| 6,315,041 B1 | 11/2001 | Carlisle |
| 6,328,105 B1 | 12/2001 | Betzold |
| 6,330,916 B1 | 12/2001 | Rickards et al. |
| 6,348,629 B1 | 2/2002 | Albright |
| 6,364,018 B1 | 4/2002 | Brannon et al. |
| 6,367,548 B1 | 4/2002 | Purvis et al. |
| 6,372,678 B1 | 4/2002 | Youngman et al. |
| 6,399,546 B1 | 6/2002 | Chang et al. |
| 6,406,789 B1 | 6/2002 | McDaniel et al. |
| 6,439,309 B1 | 8/2002 | Matherly et al. |
| 6,439,310 B1 | 8/2002 | Scott, III et al. |
| 6,451,953 B1 | 9/2002 | Albright |
| 6,491,099 B1 | 12/2002 | Di Lullo Arias et al. |
| 6,503,676 B2 | 1/2003 | Yamashita et al. |
| 6,508,305 B1 | 1/2003 | Brannon et al. |
| 6,528,157 B1 | 3/2003 | McDaniel et al. |
| 6,541,579 B2 | 4/2003 | Albright |
| 6,579,947 B2 | 6/2003 | Heitz et al. |
| 6,582,819 B2 | 6/2003 | McDaniel et al. |
| 6,632,527 B1 | 10/2003 | McDaniel |
| 6,640,897 B1 | 11/2003 | Misselbrook et al. |
| 6,667,261 B1 | 12/2003 | Anshits et al. |
| 6,705,400 B1 | 3/2004 | Nguyen et al. |
| 6,725,931 B2 | 4/2004 | Nguyen et al. |
| 6,742,590 B1 | 6/2004 | Nguyen |
| 6,749,025 B1 | 6/2004 | Brannon et al. |
| 6,766,817 B2 | 7/2004 | Dias da Silva |
| 6,772,838 B2 | 8/2004 | Dawson et al. |
| 6,776,235 B1 | 8/2004 | England |
| 6,830,105 B2 | 12/2004 | Theising |
| 6,892,813 B2 | 5/2005 | Nguyen et al. |
| 7,001,872 B2 | 2/2006 | Pyecroft et al. |
| 7,036,590 B2 | 5/2006 | Harris |
| 7,036,591 B2 | 5/2006 | Canan et al. |
| 7,036,597 B2 | 5/2006 | O'Brien et al. |
| 7,044,220 B2 | 5/2006 | Nguyen et al. |
| 7,066,258 B2 | 6/2006 | Justus et al. |
| 7,086,460 B2 | 8/2006 | Nguyen et al. |
| 7,153,575 B2 | 12/2006 | Anderson et al. |
| 7,207,386 B2 | 4/2007 | Brannon et al. |
| 7,210,528 B1 | 5/2007 | Brannon et al. |
| 7,213,651 B2 | 5/2007 | Brannon et al. |
| 7,226,971 B2 | 6/2007 | Ramesh et al. |
| 7,270,879 B2 | 9/2007 | McCrary |
| 7,271,133 B2 | 9/2007 | Weaver et al. |
| 7,303,018 B2 | 12/2007 | Cawiezel et al. |
| 7,350,572 B2 | 4/2008 | Fredd et al. |
| 7,361,693 B2 | 4/2008 | Albright et al. |
| 7,426,961 B2 | 9/2008 | Stephenson et al. |
| 7,638,468 B2 | 12/2009 | Gupta |
| 7,726,399 B2 | 6/2010 | Brannon et al. |
| 7,913,762 B2 | 3/2011 | Wheeler et al. |
| 8,061,424 B2 | 11/2011 | Willberg et al. |
| 8,173,581 B2 | 5/2012 | Huang |
| 8,936,085 B2 | 1/2015 | Boney et al. |
| 2002/0023752 A1 | 2/2002 | Qu et al. |
| 2003/0050432 A1 | 3/2003 | Ramesh et al. |
| 2003/0224165 A1 | 12/2003 | Anderson et al. |
| 2004/0023812 A1 | 2/2004 | England et al. |
| 2004/0023818 A1 | 2/2004 | Nguyen et al. |
| 2004/0040708 A1 | 3/2004 | Stephenson et al. |
| 2004/0072700 A1 | 4/2004 | Gupta et al. |
| 2004/0224165 A1 | 12/2004 | Barron et al. |
| 2004/0244978 A1 | 12/2004 | Shaarpour |
| 2004/0261996 A1 | 12/2004 | Munoz et al. |
| 2005/0016732 A1 | 1/2005 | Brannon et al. |
| 2005/0028976 A1 | 2/2005 | Nguyen |
| 2005/0028979 A1 | 2/2005 | Brannon et al. |
| 2005/0059558 A1 | 3/2005 | Blauch et al. |
| 2005/0089631 A1 | 4/2005 | Nguyen et al. |
| 2005/0130848 A1 | 6/2005 | Todd et al. |
| 2005/0244641 A1 | 11/2005 | Vincent |
| 2005/0272612 A1 | 12/2005 | Dawson et al. |
| 2005/0274523 A1 | 12/2005 | Brannon et al. |
| 2006/0073980 A1 | 4/2006 | Brannon et al. |
| 2006/0185848 A1 | 8/2006 | Surjaatmadja et al. |
| 2008/0139416 A1 | 6/2008 | Rimassa et al. |
| 2008/0179057 A1 | 7/2008 | Dawson |
| 2010/0200235 A1* | 8/2010 | Luo .................. C09K 8/50 166/284 |
| 2010/0263866 A1 | 10/2010 | Huang et al. |
| 2011/0180259 A1 | 7/2011 | Willberg et al. |
| 2012/0024530 A1 | 2/2012 | Todd et al. |
| 2012/0073809 A1 | 3/2012 | Glum et al. |
| 2012/0085536 A1 | 4/2012 | Alboudwarej et al. |
| 2012/0267102 A1 | 10/2012 | Huang et al. |
| 2012/0285692 A1* | 11/2012 | Potapenko ............ E21B 21/003 166/308.1 |
| 2013/0168096 A1 | 7/2013 | Parkhonyuk et al. |
| 2014/0178325 A1 | 6/2014 | Martinez-Castro et al. |
| 2015/0129214 A1 | 5/2015 | Boney et al. |
| 2015/0233226 A1 | 8/2015 | Holzhauser |

FOREIGN PATENT DOCUMENTS

| | | |
|---|---|---|
| EP | 0773343 A2 | 5/1997 |
| EP | 1023382 B1 | 8/2006 |
| GB | 2319796 A | 6/1998 |
| WO | 0005302 A1 | 2/2000 |
| WO | 0166908 A2 | 9/2001 |
| WO | 0226656 A1 | 4/2002 |
| WO | 2004083600 A1 | 9/2004 |
| WO | 2011018257 A1 | 2/2011 |

OTHER PUBLICATIONS

Kaageson-Loe et al. "Particulate-Based Loss-Prevention Material—The secrets of Fracture Sealing Revealed" SPE 112595 Dec. 2009.*

Savari et al. "Engineered LCM Design Yields Novel Activating Material for Potential Application in Severe Lost Circulation Scenarios" SPE 164748 Apr. 2013.*

Savari et al. "Improved Lost Circulation Treatment Design and Testing Techniques Minimize Formation Damage" SPE 143603 Jun. 2011.*

Reddy et al. "Activator development for Controlling Degradation Rates of Polymeric Diverting Agents" SPE 164117 Feb. 2014.*

Frank F. Chang, Xiandong Qiu, Hisham A. Nasr-El-Din; "Chemical Diversion Techniques Used for Carbonate Matrix Acidizing: An Overview and Case Histories" 2007 SPE International Symposium

(56) References Cited

OTHER PUBLICATIONS on Oilfield Chemistry; SPE 106444; Feb. 28-Mar. 2, 2007; Houston, Texas.

Dave Allison; "Accessfrac Service Diversion Technology"; HO9034; Jan. 30, 2011; 45 pages; Haliburton Energy Services.

Halliburton; "AccessFrac Stimulation Service: Enhanced Proppant Distribution Provides Improved Access to Complex Fracture Networks in Shale Formations"; HO8720; Nov. 2011; 2 pages; Haliburton Production Enhancement.

Savari et al, "Improved Lost Circulation Treatment Design and Testing Techniques Minimize Formation Damage", SPE 143603, Jun. 7, 2011-Jun. 10, 2011, The Netherlands, pp. 1-8.

Wood et al.; Ultra-Lightweight Proppant Development Yields Exciting New Opportunities in Hydraulic Fracturing Design; SPE 84309; Society of Petroleum Engineers. Inc; 2003.

Gupta et al: The History and Success of Liquid CO2 and CO2/N2 Fracturing System; SPE 40016; Society of Petroleum Engineers, Inc: 1998.

\* cited by examiner

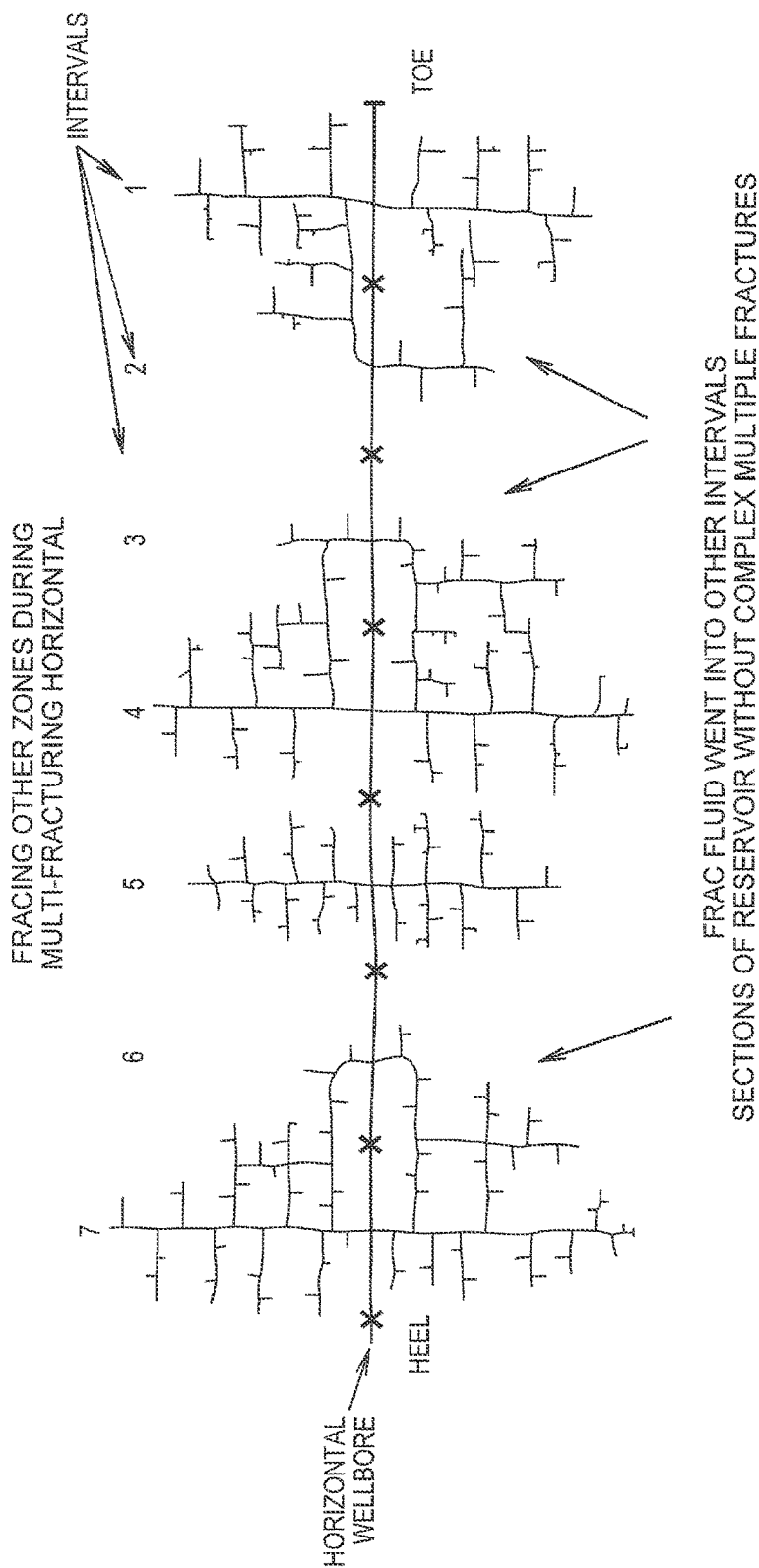

DIVERTING SYSTEMS FOR USE IN LOW TEMPERATURE WELL TREATMENT OPERATIONS

This application is a continuation-in-part application of U.S. patent application Ser. No. 13/928,006, filed on Jun. 26, 2013, which claims the benefit of U.S. patent application Ser. No. 61/664,640, filed on Jun. 26, 2012, both of which are herein incorporated by reference.

FIELD OF THE DISCLOSURE

The disclosure relates to methods of re-directing well treatment fluids from high permeability zones of a subterranean formation to low permeability zones with aliphatic polyesters by using phthalic acid, terephthalic acid and derivatives thereof to enhance the performance of the aliphatic polyester in low temperature operations.

BACKGROUND OF THE DISCLOSURE

In the past, much interest has focused on methods for improving downhole placement of well treatment fluids used in acid stimulation and hydraulic fracturing operations. Acid simulation of a hydrocarbon producing formation, such as by matrix acidizing, enhances the production of hydrocarbons. In this procedure, acid or an acid-forming material is injected into the formation and the acid reacts with minerals in the formation. As a result, near-wellbore permeability is improved by the opening of channels or wormholes within the formation. In addition to dissolving formation materials, the acid may remove blockages caused by natural or man-made conditions. The procedure is especially prevalent in the treatment of carbonate formations since the reaction products are soluble in the spent acid.

Early attempts at optimizing the placement of acid downhole focused on injection of a simple acidic solution into the wellbore. Such attempts proved to be inefficient as the fluid often reacted or was spent too quickly. Such treatment fluids were therefore incapable of penetrating deep into the formation, thereby limiting their effectiveness to very near-wellbore applications. Thus, where the treated subterranean formation contained sections with varying permeability, the injected acid typically acidized the zone within the formation which had the highest permeability and the highest degree of water saturation. A permeability contrast between areas of high permeability (treated areas) within the formation and areas of low permeability (untreated areas) resulted.

It is necessary that acid placement downhole be optimized in order to provide uniform distribution of treatment fluid over the zone being treated. Chemical, as well as mechanical, methods have been developed in order to divert the flow of treatment fluids from the higher permeability and/or water saturated sections of the formation to the lower permeability or oil bearing sections. The difference between chemical and mechanical diversion is that chemical diverting agents achieve diversion by increasing flow resistance inside the created channels, whereas mechanical diversion controls the fluid entry point at the wellbore. Hence chemical diverting agents are often considered to be internal diverting agents compared to external mechanical diversion.

Chemical diversion has been previously achieved by the use of aliphatic polyesters, such as polylactic acids. While such products exhibit desirable degradation rates at higher temperatures, typically in excess of 250° F., they are extremely slow to dissolve at lower temperatures. As a result, such materials have not been useful in reservoirs having a bottomhole temperature lower than 250° F. Alternatives have therefore been sought for the use of such polyesters in reservoirs having bottomhole temperatures lower than 250° F.

SUMMARY OF THE DISCLOSURE

This disclosure relates to a method of re-directing a well treatment fluid to targeted zones of a subterranean formation within a reservoir by diverting the fluid away from high permeability or undamaged zones of the formation by temporarily blocking the high permeability zones. In an embodiment, the downhole temperature of the reservoir is between from about 80° F. to about 190° F. In some instances, such as where an accelerated dissolving rate is required for the compound of formula (I), the blended material could be used up to about 250° F.

In an embodiment, a well treatment fluid is diverted from a high permeability or undamaged zone of a formation within a reservoir having a bottomhole temperature less than 250° F. by introducing into the reservoir a mixture of particulates of:

(i) one or more aliphatic polyesters having the general formula of repeating units:

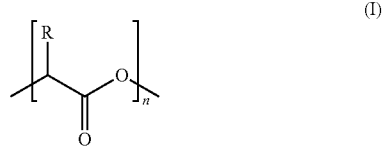

where n is an integer between 75 and 10,000 and R is selected from the group consisting of hydrogen, alkyl, aryl, alkylaryl, acetyl, heteroatoms, and mixtures thereof; and (ii) one or more compounds of the formula:

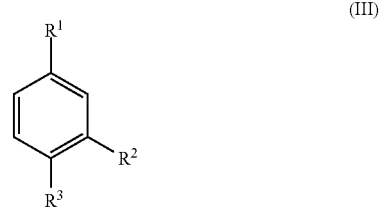

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ or $R^3$ are —COO—$(R^5O)_y$—$R^4$ when $R^1$ is —H and further provided only one of $R^2$ or $R^3$ is —COO—$(R^5O)_y$—$R^4$
when $R^1$ is —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

The particulates have a sized particle distribution to block the penetration of the fluid into the high permeability zone of the formation. The flow of the fluid is then diverted to a low permeability portion of the formation.

In another embodiment, particulates having the structural formula (I) and (III) form bridging solids on the face of a subterranean formation within a reservoir which diverts the flow of treatment fluid away from the high permeability zone of the formation. The downhole temperature of the reservoir is typically between from about 140° F. to about 190° F. The compound(s) of formula (III) enhance the performance of the particulates of formula (I) at such downhole temperatures.

In another embodiment, particulates having the structural formula (I) and (III) form a relatively low-permeability filter cake on the face of the subterranean formation. The pressure drop through the filter cake increases the flow resistance of well treatment fluid through the formation and diverts the treatment fluid to other parts of the formation.

In another embodiment, particulates having the structural formula (III), when used in combination with the aliphatic polyester of formula (I), enhance degradation of the aliphatic polyester at bottomhole temperatures less than 250° F. and thus enable the aliphatic polyester to be useful in lower temperature reservoirs.

In another embodiment, an acidizing fluid containing the particulates of structural formula (III) in combination with the aliphatic polyester of formula (I) is provided to divert fluids from a high permeability zone to a lower permeability zone of a formation exhibiting a bottomhole temperature less than 250° F.

In another embodiment, a hydraulic fracturing fluid is diverted away from a high permeability zone to a lower permeability zone of a formation by introducing into the formation a mixture of particulates having structural formula (III) and an aliphatic polyester of formula (I). The particulates of structural formula (III) enhance the degradation of the aliphatic polyester and thus provide a method of using the aliphatic polyester at bottomhole temperatures less than 250° F.

In another embodiment, a mixture of particulates of formula (I) and formula (III) may be used in a fluid loss pill to control leak-off of treatment fluids to the formation.

In another embodiment, a mixture of particulates of formula (I) and formula (III) may be used in a wellbore completion fluid to enable formation of a filter cake over the surface of the wellbore.

In another embodiment, a mixture of particulates of formula (I) and formula (III) may be used as a clean-out fluid.

In another embodiment, a mixture of particulates of formula (I) and formula (III) may be used to form a permeable pack during a sand control operation, such as gravel packing Characteristics and advantages of the present disclosure described above and additional features and benefits will be readily apparent to those skilled in the art upon consideration of the following detailed description of various embodiments and referring to the accompanying drawing.

BRIEF DESCRIPTION OF THE DRAWINGS

The following figures are part of the present specification, included to demonstrate certain aspects of various embodiments of this disclosure and referenced in the detailed description herein:

FIG. 1 illustrates the reduction in fracturing areas which are outside of intervals subjected to fracturing by use of the mixture disclosed herein.

DETAILED DESCRIPTION OF THE PREFERRED EMBODIMENTS

Aliphatic polyesters for use as a diverter in the method disclosed herein include those having the general formula of repeating units shown below:

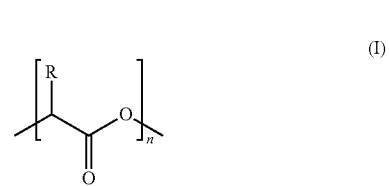

where n is an integer between 75 and 10,000 and R is selected from the group consisting of hydrogen, alkyl (preferably a $C_1$-$C_6$ alkyl), aryl (preferably a $C_6$-$C_{18}$ aryl), alkylaryl (preferably having from about 7 to about 24 carbon atoms), acetyl, heteroatoms (such as oxygen and sulfur) and mixtures thereof. In a preferred embodiment, the weight average molecular weight of the aliphatic polyester is between from about 100,000 to about 200,000.

A preferred aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula (I) without any limitation as to how the polymer was made such as from lactides, lactic acid, or oligomers, and without reference to the degree of polymerization.

The lactide monomer exists generally in three different forms: two stereoisomers L- and D-lactide and racemic D,L-lactide (meso-lactide). The oligomers of lactic acid, and oligomers of lactide may be defined by the formula:

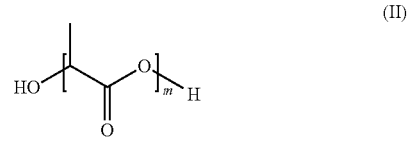

where m is an integer: $2 \leq m \leq 75$. Preferably m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semi-crystalline polymer with a relatively slow hydrolysis rate. Poly(D,L-lactide) may be a more amorphous polymer with a resultant faster hydrolysis rate. The stereoisomers of lactic acid may be used individually or combined. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers may be modified by blending high and low molecular weight polylactide or by blending polylactide with other polyesters.

As an alternative to the aliphatic polyesters of formula (I), the phthalic acid or phthalic acid anhydride of formula (III) may be used to enhance the activity of other aliphatic polyesters including star- and hyper-branched aliphatic polyesters polymers as well as other homopolymers, random, block and graft copolymers. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; orthoesters; poly(glycolide); poly(c-caprolactone); poly(hydroxybutyrate); poly(anhydrides); aliphatic polycarbonates; poly(orthoesters); poly(amino acids); poly(ethylene oxide); and polyphosphazenes.

The aliphatic polyester(s) may be used in reservoirs having a bottomhole temperature less than 250° F. by the presence of particulates having the structural formula (III):

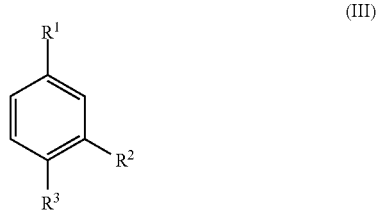

(III)

wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ or $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

Alternatively, the particulates may be an anhydride of the compound of structural formula (III).

In a preferred embodiment, $R^2$ of the compound of formula (III) is —H and $R^3$ is —COO—$(R^5O)_y$—$R^4$. In an especially preferred embodiment, the compound of formula (III) is phthalic acid (wherein y is O and $R^1$ and $R^4$ are —H). In another preferred embodiment, the compound of formula (III) is phthalic acid anhydride.

Still in another preferred embodiment, $R^2$ of the compound of formula (III) is —COO—$(R^5O)_y$—$R^4$ and $R^3$ is —H. In an especially preferred embodiment, the compound of formula (III) is terephthalic acid (wherein y is O and $R^2$ and $R^4$ are —H). In another preferred embodiment, the compound of formula (III) is terephthalic acid anhydride.

In a preferred embodiment, the particulates of formula (I) and (III) may be of any size or shape. For instance, the particulates may be substantially spherical, such as being beaded, or pelleted. Further, the particulates may be non-beaded and non-spherical such as an elongated, tapered, egg, tear-drop or oval shape or mixtures thereof. For instance, the particulates may have a shape that is cubic, bar-shaped (as in a hexahedron with a length greater than its width, and a width greater than its thickness), cylindrical, multi-faceted, irregular, or mixtures thereof. In addition, the particulates may have a surface that is substantially roughened or irregular in nature or a surface that is substantially smooth in nature.

The particulates defining the mixture or use in the method disclosed herein have a sized particle distribution effective to block the penetration of the fluid into the high permeability zone of the formation. Typically, the particle size distribution of the particulates is in the range from about 0.1 micron to about 1.0 millimeter.

The weight ratio of particulates of formula (I) and particulates of formula (III) introduced into the well is typically between from about 90:10 to about 10:90 and more typically between from about 40:60 to about 60:40.

The particulates are particularly effective when placed into wells having bottom hole temperatures between from about 140° F. to about 190° F. The compound of formula (III) enhances the performance of the aliphatic polyester of formula (I) since in the absence of the compound of formula (III) the aliphatic polyester is non-dissolvable or sparingly soluble at bottomhole temperatures less than 250° F. When used in combination with the compound of formula (III), the aliphatic polyesters may be used in reservoirs having a bottomhole temperature less than 250° F.

The particulates may be partially, but not fully, dissolved at in-situ reservoir conditions. Typically, the particulates are fully dissolved over time at bottomhole temperatures. In most instances, the particulates are fully dissolved subsequent to completion of the well treatment operation.

The fluid of the treatment fluid containing the particulates may be any fluid suitable for transporting the particulates into the reservoir and/or subterranean formation such as water, salt brine and slickwater. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from about 0% to about 60% by weight, based upon the weight of the water.

Typically, the amount of compound(s) of formula (I) in the fluid introduced into the well is between from about 0.01 to about 30 weight percent (based on the total weight of the fluid) and the amount of the compound(s) of formula (III) in the fluid is from about 0.01 to about 3% by weight.

The fluid of the treatment fluid may be foamed with a liquid hydrocarbon or a gas or liquefied gas such as nitrogen or carbon dioxide.

In addition, the fluid may further be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates, such as those disclosed in U.S. Patent Publication No. 2010/0204069, herein incorporated by reference. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amido amine quaternary ammonium salts.

The pH of the fluid containing the particulates may further be adjusted when desired. When adjusted, it typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling carbon dioxide through the fluid.

The fluid may be gelled or non-gelled. Typically the fluid is gelled by the inclusion of a viscosifying agent such as a viscosifying polymer or viscoelastic fluid. The fluid may contain a crosslinking agent though a crosslinking agent is not required. Generally, the viscosity of the fluid is greater than or equal to 10 cP at room temperature.

In a preferred embodiment, particulates of formula (I) are used as a diverter in the stimulation of a subterranean formation penetrated by a reservoir where it may be introduced into productive zones of a formation having various permeabilities. The bottomhole temperature of the reservoir may be less than 250° F. and may be as low as 140° F. The particulates are capable of diverting a well treatment fluid from a high permeability zone to a low permeability zone of a subterranean formation at such bottomhole temperatures. Since conductivity is permeability multiplied by injection geometry, this is synonymous to the statement that the particulates are capable of diverting a well treatment fluid from a highly conductive primary fracture(s) to less conductive secondary fractures. Further, since conductivity is a function of the relative resistance to inflow, the reference to a conductive fracture as used herein is considered synonymous to a conductive reservoir area.

The size distribution of the particulates of formula (I) and (III) should be sufficient to block the penetration of the fluid into the high permeability zone of the formation. By bridging the flow spaces on the face of the formation, the solid particulates of formula (I) and formula (III) form a filter cake. The pressure drop though the filter cake increases the flow resistance and diverts treatment fluid to less permeable zones of the formation. The filter cake is more easily formed when at least 60%, more preferably 80%, of the particulates of formula (I) and (III) within the well treatment fluid have a particle size between from about 150 μm to about 2000 μm.

For instance, when employed in acid fracturing, the particulates are of sufficient size to bridge the flow space (created from the reaction of the injected acid with the reservoir rock) without penetration of the matrix. By being filtered at the face of the formation, a relatively impermeable or low permeability filter cake is created on the face of the formation.

When used as a diverter, the fluid containing the particulates may be pumped directly to the high permeability zone of the well formation. The majority of the diverting fluid will enter into the high permeability or non-damaged zone and form a temporary "plug" or "viscous pill" while the lower permeability zone has little invasion. This temporary "viscous pill" causes a pressure increase and diverts the fluid to a lower permeability portion of the formation. The particulates are capable of being spread deeper into subterranean formations than diverting agents of the prior art.

Once in place, the viscous pill formed from the diverter will have a finite depth of invasion which is related to the pore throat diameter. For a given formation type, the invasion depth is directly proportional to the nominal pore throat diameter of the formation. Since varying depths of invasion occur throughout the formation based upon the varying permeability or damage throughout the treated zone, the ability of the treatment fluid to invade into pore throats is dependent on the difference between pore throat sizing of the damaged and non-damaged formation. Invasion depths will normally be greater in the cleaner or non-damaged portion of the formation (larger pore throats) than in the lower permeability or damaged zones (smaller or partially filled pore throats). With a greater depth of invasion in the cleaner sections of the formation, more of the diverter may be placed in these intervals.

The mixture defined herein further has particular applicability when used to increase the productivity of hydrocarbons far field from the wellbore as well as near wellbore. For instance, the mixture may be used to increase the productivity of low permeability formations such as in stimulation operation where discrete intervals or clusters are formed along a horizontal wellbore. The particle size of the particulates of the fluid may be such that they are capable of flowing into the fracture and thereby pack the fracture in order to reduce the permeability of at least some of the fractures in the formation. The mixture defined herein thus may be used to increase the stimulated rock volume (SRV) of the formation between production areas and clusters by increasing the distribution of the area subjected to fracturing.

The mixture may also be used to create a complex fracture network within a formation. Thus, the mixture may be used as a fracturing fluid and may be pumped into the formation at a pressure sufficient to create or enlarge a primary fracture. In other instances, a fracturing fluid not containing the mixture may be pumped into the formation. Such other fracturing fluids may include those fluids containing a viscosifying agent other than that of the mixture defined herein. Further, the fracturing fluid used to create or enlarge the fracture may be slickwater. After the primary fracture is created or enlarged, a second fluid containing the mixture defined herein may be pumped into the formation. At least one secondary fracture having a directional orientation distinct from the directional orientation of the primary fracture may be created. The second fluid diverts the flow of the second fluid into the secondary fracture. This process may repeated and multiple fluids containing the mixture defined herein may be pumped into the formation to divert the flow of a preceding fluid. In this manner, a complex fracture network may be created consisting of multiple fractures in the formation originating from the primary fracture.

In another embodiment, the particle size of the compounds of formula (I) and (II) may be selected such that particulates of the mixture form a bridge on the face of the rock. In this manner, the particle size of the particulates are such that slugs containing the particulates of the mixture may be pumped into the formation, pass through the perforations or clusters and then form a bridge in the near-wellbore area within the fracture. Such packing of the fracture temporarily reduce the conductivity of at least some of the fractures in the formation. This, in turn, assists diversion of the fracturing fluid more evenly.

The mixture defined herein may further be used to further limit the fracturing of zones in formations (such as shale formations) which are known to exhibit non-uniform interval coverage. Microseismic mapping and well temperature logging often show poor frac fluid distribution across each interval and re-fracturing of nearby intervals. By directing the placement of fluid containing particulates of the mixture within the fractured zones, out of intervals fracturing areas are reduced. This is shown in FIG. 1.

Re-fracturing of a formation using the mixture disclosed herein is especially useful in the re-fracturing of horizontal wells. In such cases, a portion of the wellbore or the entire lateral of the wellbore may be perforated in a multitude of locations, sometimes dozens of locations, from the original fracture stimulation. Further, the wellbore may have new perforated clusters added during the re-fracturing operation that are intended to be fracture treated for the first time. With all of such perforations open, a pill or plug of a fluid containing the particulates of the mixture defined herein may be pumped into the formation. The particulates plug off the zones that are readily accepting the fluid most rapidly such that the fluid moves toward the areas of the formation which are more difficult to treat.

Where the particulates are components of an acidizing solution, the amount of aqueous acid in the fluid may range from about 70 to about 99 volume percent and the strength of the acid may be greater than or equal to 10%. The acid reacting, with the rock, lowers the acid strength to a concentration less than 15%.

In another preferred embodiment, the particulates are used as a fluid loss pill in the control of leak-off of the treatment fluid to the formation. The fluid loss pill is a specific fluid that is injected into the well and designed to alleviate the fluid loss, particularly from completion fluids, into the formation. In specific situations, such as during perforation of the well casing, it is considered particularly advantageous to incorporate a fluid loss pill in addition to the normal fluid loss control additives typically included in the wellbore treatment fluids. The operator may control leak-off of the treatment fluid to the formation by controlling the size differential between the particulates and the pore throats. Solid particulates of formula (I) and (III) are deposited on the formation wall and form a substantially impermeable filter cake.

Particulates of formula (I) and (III) may further be used in completion fluids. Completion fluids are utilized when conducting various completion operations in the producing formations. Such particulates seal off the face of the wellbore so that the fluid is not lost to the formation. The particulates are deposited and form a filter cake of the solids in the fluid over the surface of the wellbore without any loss of solids to the formation. As such, the particulates form a fluid bridge over the formation pores rather than permanently plugging the pores.

Fluids containing the particulates may also be useful as a sand control fluid. In one exemplary embodiment, a gravel pack operation may be carried out on a wellbore that penetrates a subterranean formation to prevent or substantially reduce the production of formation particles into the wellbore from the formation during production of formation fluids. A screen assembly such as is known in the art may be placed or otherwise disposed within the wellbore so that at least a portion of the screen assembly is disposed adjacent the subterranean formation. A slurry including particulates of formula (I) and (III) and a treatment fluid for carrying the particulates may then be introduced into the wellbore and placed adjacent the subterranean formation by circulation or other suitable method so as to form a fluid-permeable pack in an annular area between the exterior of the screen and the interior of the wellbore. This permeable pack is capable of reducing or substantially preventing the passage of formation particles from the subterranean formation into the wellbore during production of fluids from the formation, while at the same time allowing passage of formation fluids from the subterranean formation through the screen into the wellbore.

The particulates described herein may further be used in well intervention applications, such as wellbore clean-out wherein solid debris, especially hydrophobic materials, are removed from the wellbore in order to ensure unobstructed hydrocarbon recovery. For instance, fluid containing particulates of formula (I) and formula (III) may be introduced into the wellbore, such as by coiled tubing, to remove hydrophobic particulate materials remaining in the wellbore. In an embodiment, the particulates may agglomerate the hydrophobic particulate material and the agglomerate may then be removed or carried upward to the surface. Clean-out may also occur the well is drilled and prior to stimulation. The use of the particulates in such clean-out operations cuttings are removed that could adversely affect the subsequent injection of fracturing fluid.

While the particulates are most typically a component of the treatment fluid (i.e., acidizing fluid, hydraulic fracturing fluid, wellbore completion fluid, etc.), a fluid containing particulates of formula (I) and (III) may be pumped into the wellbore followed by or prior to the addition of the well treatment fluid (i.e., acidizing fluid, hydraulic fracturing fluid, wellbore completion fluid, etc.).

For instance, when used in hydraulic fracturing, the particulates perform as a diverter and may be a component of the hydraulic fracturing fluid or may be pumped into the formation as a component of a pad fluid. Further, in an acid fracturing operation, a stage of acid may preferably be injected following introduction of a fluid containing the diverter.

Further, a fluid containing the particulates of formula (I) and (III) may be pumped into the wellbore in alternative stages and may be separate by spacer fluids. The spacer fluid typically contains a salt solution such as NaCl, KCl and/or $NH_4Cl$. For instance, the loss in viscosity of a fluid loss pill may require additional diverter stages to be pumped. In addition, alternate stages may be required to more appropriately treat a heterogeneous formation. For instance, when used in an acid stimulation operation, it may be desirable to alternate the pumping of acid stimulation fluids and diverting fluids. An exemplary pumping schedule may be (i) pumping an acid stimulation fluid; (ii) optionally pumping a spacer fluid; (iii) pumping a fluid containing the diverter; (iv) optionally pumping a spacer fluid; and then repeating the cycle of steps (i), (ii), (iii) and (iv).

The fluid containing the particulates may further contain additional well treatment fluid additives. These include one or more conventional additives to the well service industry such as a gelling agent, fluid loss additives, gel breaker, surfactant, demulsifier, biocide, mutual solvent, surface tension reducing agent, defoaming agent, demulsifier, non-emulsifier, scale inhibitor, gas hydrate inhibitor, enzyme breaker, oxidative breaker, buffer, clay stabilizer, acid, buffer, solvent or a mixture thereof.

Where the fluid containing the particulates is an acidizing fluid, it may be preferable to include within the fluid a corrosion inhibitor, a corrosion inhibitor intensifier, or a combination thereof. The purpose of these additives is to reduce the corrosive effects that the acids may have on the well tubulars. Suitable corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized carboxylic acids (e.g., 4-(t-butyl)-benzoic acid and formic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Fluids containing particulates of formula (I) and (III) may also have an internal breaker built into the system to insure that the fluid viscosity can be reduced after a period of time. The internal breaker may also be an oxidizer such as, but not limited to, persulfates, such as ammonia persulfate and sodium persulfate, and peroxidizers such as hydrogen peroxide.

The formation subjected to the treatment of the disclosure may be a hydrocarbon or a non-hydrocarbon subterranean formation. The high permeability zone of the formation into which the fluid containing the diverter is pumped may be natural fractures. When used with low viscosity fracturing fluids, the particulates of formula (I) and (III) are capable of diverting fracturing fluids to extend fractures and increase the stimulated surface area.

The disclosure has particular applicability to the stimulation of carbonate formations, such as limestone, chalk or dolomite as well as subterranean sandstone or siliceous formations in oil and gas wells, including quartz, clay, shale, silt, chert, zeolite, or a combination thereof.

In another preferred embodiment, the diverter is introduced into coal beds having a series of natural fractures, or cleats, for the recovery of natural gases, such as methane, and/or sequestering a fluid which is more strongly adsorbing than methane, such as carbon dioxide and/or hydrogen sulfide.

EXAMPLES

The following designations are used in the Example:

A: a 90:10 v/v mixture of phthalic anhydride:phthalic acid, 20/40 mesh, melting range[1]: 268-270° F.;
B: a 85:15 v/v mixture of phthalic anhydride:phthalic acid, 8/50 mesh, melting range: 268-356° F.;
C: polylactic acid, 14/70 mesh, melting range: 298-329° F.;
D: polylactic acid, 10/70 mesh, melting range: 336-345° F.
C&D were prepared by grinding pellets of polylactic acid, commercially available as INGEO® 4340-D from NatureWorks LLC, to the designated size.

[1] Melting range represents the temperature at which the solid started to soften to when it was completely melted.

Example 1

Phthalic anhydride (obtained from a commercial supplier) and Sample A (8 g of each) were first diluted in 100 mL deionized water or HCl 15% for 20 hours at 180° F., and then left for 3 hours at room temperature. The mixture was vacuum filtrated with 100 mL water and dried for 24 hours at 160° F. The results are set forth in Table I.

TABLE I

| Sample | Dissolved (%) | Melting Range[2], ° F. | Solvent |
|---|---|---|---|
| Commercial Phthalic Anhydride | 6 | 403 | Deionized water |
| Sample A | 7.5 | 401 | Deionized water |
| Sample A, crushed | 4 | 397-399 | Deionized water |
| Commercial Phthalic Anhydride | 4 | 412 | HCl 15% |
| Sample A | 0 | 410 | HCl 15% |
| Sample A, crushed | 16 | 415 | HCl 15% |

[2]Undissolved sample, not starting material.

FTIR and melting point of the recovered undissolved samples showed that the remaining phthalic anhydride had converted into phthalic acid.

Example 2

Samples of Sample A (each 5 g) were diluted in 100 mL of either deionized water (DI) or tap water for (1) 54 hours at 180° F. and (2) 64 hours at 140° F. and then left to cool at room temperature. The solids were vacuum filtrated with 100 mL water and dried for 24 h at 160° F. The results are set forth in Table II).

TABLE II

| 64 hr PERCENT SOLUBILITY @ 140° F. | | 54 hr PERCENT SOLUBILITY @ 180° F. | |
|---|---|---|---|
| tap water | DI | tap water | DI |
| 18.5 | 13.4 | 5.6 | 9.3 |

The FTIR and melting point of the recovered undissolved samples showed that the remaining phthalic anhydride had converted into phthalic acid. Table II illustrates that more phthalic anhydride was converted to phthalic acid at higher temperatures. Sample A was thus more suitable for lower temperature applications.

Example 3

Different initial weights of Sample A were diluted in 18 mL of deionized water for 24 hours at 250° F. using a digestion vessel. After leaving the samples to cool, they were vacuum filtrated with deionized water and dried for 24 hours at 160° F. The results are set forth in Table III. The FTIR and melting point of the recovered undissolved samples showed that the remaining phthalic anhydride had converted into phthalic acid.

TABLE III

| Initial Weight (g) | % dissolved |
|---|---|
| 1 | 55.6 |
| 0.5 | 83.7 |
| 0.25 | 100 |
| 0.1 | 100 |
| 0.05 | 100 |
| 0.025 | 100 |

Example 4

Different initial weights of Sample C were tested for solubility by using a digestion vessel (at 250° F. for 24 hours) and diluting in 18 mL of DI water, using different sample concentrations. The results are set forth in Table IV.

TABLE IV

| Amount (g) | % Dissolved |
|---|---|
| 1.000 | 100 |
| 0.500 | 100 |
| 0.250 | 100 |
| 0.100 | 100 |
| 0.050 | 100 |
| 0.025 | 100 |

Example 5

Samples were dissolved in water and heated in a water bath. After reaching room temperature, the samples were filtered via a vacuum. The recovered material was then dried overnight and the percentage of dissolved solids was calculated based on the amount of sample retained on a Whatman #41 filter paper. All samples were allowed to dry for at least 24 hours at approximately 160° F. The samples (2.5 total) were then tested for solubility in 50 mL of deionized water using different temperatures (heating for 24 or 48 hours). The 1:1 mixture of Sample B and Sample C were made by mixing equal amounts of each product (1.25 g) and diluting in 50 mL total deionized water. The results are set forth in Table V:

TABLE V

| SAMPLE | 24 hr | | 48 hr | | |
| --- | --- | --- | --- | --- | --- |
| | 140° F. | 180° F. | 80° F. | 180° F. | 300° F. |
| B | 8.7 | 21.6 | 19.9 | 5.4 | 11.0 |
| B | 6.1 | n/a | 24.1 | n/a | 10.5 |
| C | 0.31 | 1.1 | 0.99 | 9.9 | 99.3 |
| C | 0.30 | n/a | 0.98 | n/a | 99.2 |
| B:C | 10.9 | 31.1 | 13.8 | 30.1 | 90.5 |
| B:C | 10.2 | n/a | 12.9 | n/a | 87.2 |

Example 6

Additional solubility tests were performed using Sample B and Sample D (2.5 g total) in 50 mL of deionized water using different temperatures (heating for 24 or 48 hr). The 1:1 mixture of Sample B:Sample D was made by mixing equal amounts of each product (1.25 g) and diluting in 50 mL deionized water. The results are set forth in Table VI:

TABLE VI

| SAMPLE | 24 hr | | 48 hr |
| --- | --- | --- | --- |
| | 150° F. | 180° F. | 150° F. |
| B | 24.8 | 21.6 | 16.5 |
| D | 0.2 | 0.24 | 0.1 |
| 1:1 B:D | 20.2 | 23.1 | 16.7 |

The Examples illustrate that phthalic anhydride/phthalic acid is more suitable as a diverting agent in lower temperatures (180-250° F.) applications and polylactic acid is more suitable as a diverting agent at higher temperature higher temperature (>250° F.) applications. The Examples further illustrate, based on the solubility results, that phthalic anhydride/phthalic acid acts enhances lowering the temperature at which polylactic acid dissolves. When mixed with polylactic acid, the Examples illustrate that phthalic anhydride/phthalic acid acts to enhance the activity of polylactic acid, while lowering the temperature at which polylactic dissolves. Thus, when mixed with phthalic anhydride/phthalic acid, polylactic acid may be used in lower temperature applications.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of stimulating a subterranean formation penetrated by a reservoir, the method comprising:
   (A) introducing into the reservoir a fluid comprising a mixture of diverter particles comprising:
   (i) at least one aliphatic polyester having the general formula of repeating units:

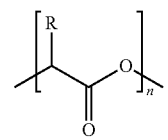

(I)

where n is an integer between 75 and 10,000 and R is selected from the group consisting of hydrogen, alkyl, aryl, alkylaryl, acetyl, heteroatoms, and mixtures thereof; and
   (ii) at least one compound of the formula:

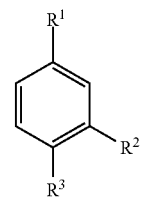

(III)

or an anhydride thereof
   wherein:
      $R^1$ is —COO—$(R^5O)_y$—$R^4$ or —H;
      $R^2$ and $R^3$ are selected from the group consisting of —H and —COO—$(R^5O)_y$—$R^4$;
         provided both $R^2$ and $R^3$ are —COO—$(R^5O)_y$—$R^4$ when $R^1$ is —H and further provided only one of $R^2$ and $R^3$ is —COO—$(R^5O)_y$—$R^4$ when $R^1$ is —COO—$(R^5O)_y$—$R^4$
      $R^4$ is —H or a $C_1$-$C_6$ alkyl group;
      $R^5$ is a $C_1$-$C_6$ alkylene group; and
      each y is 0 to 5
         wherein the diverter particles have a sized particle distribution to block penetration of the fluid into a high permeability zone of the formation; and
   (B) diverting the flow of the fluid to a low permeability portion of the formation.

2. The method of claim 1, wherein the aliphatic polyester is poly(lactide).

3. The method of claim 1, wherein the aliphatic polyester has a particle size distribution in the range from about 0.1 micron to about 1.0 millimeter.

4. The method of claim 1, wherein the weight ratio of (I) and (II) in the fluid is from about 10:90 to about 90:10.

5. The method of claim 1, wherein the amount of at the least one compound of formula (III) in the fluid is from about 0.01 to about 3% by weight.

6. The method of claim 1, wherein the amount of compound of formula (I) in the fluid is from about 0.01 to about 30 volume percent.

7. The method of claim 1, wherein the downhole temperature of the reservoir is between from about 80° F. to about 190° F.

8. The method of claim 1, wherein $R^1$ is —H and $R^3$ is —COO—$(R^5O)_y$—$R^4$.

9. The method of claim 8, wherein y is 0 and $R^4$ is —H.

10. The method of claim 8, wherein $R^1$ is —COO—$(R^5O)_y$—$R^4$ and $R^2$ is —H.

11. The method of claim 10, wherein y is 0 and $R^4$ is —H.

12. The method of claim 1, wherein the at least one compound of formula (III) is phthalic anhydride.

13. The method of claim 1, wherein the at least one compound of formula (III) is terephthalic anhydride.

14. The method of claim 1, wherein the at least one compound of formula (III) is phthalic acid.

15. The method of claim 1, wherein the at least one compound of formula (III) is terephthalic acid.

16. The method of claim 1, wherein the fluid is an acidizing fluid.

17. The method of claim 1, wherein the fluid is a hydraulic fracturing fluid.

18. The method of claim 1, wherein the fluid is a wellbore completion fluid.

19. The method of claim 1, wherein the fluid is a fluid loss pill.

20. The method of claim 1, wherein the high permeability zone has natural fractures.

21. The method of claim 1, wherein the subterranean formation is sandstone or carbonate.

22. A method of re-directing a well treatment fluid from a first zone to a second zone of a subterranean formation penetrated by a reservoir during stimulation of the subterranean formation, wherein permeability of the first zone is higher than permeability of the second zone, the method comprising:
(A) pumping into the reservoir a fluid comprising a mixture of particulates comprising:
(i) at least one aliphatic polyester having the general formula of repeating units:

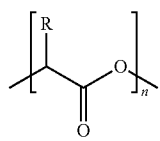

(I)

where n is an integer between 75 and 10,000 and R is selected from the group consisting of hydrogen, alkyl, aryl, alkylaryl, acetyl, heteroatoms, and mixtures thereof; and
(ii) at least one compound of the formula:

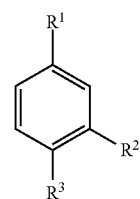

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ and $R^3$ are —COO—$(R^5O)_y$—$R^4$ when $R^1$ is —H and further provided only one of $R^2$ and $R^3$ is —COO—$(R^5O)_y$—$R^4$ when $R^1$ is —COO—$(R^5O)_y$—$R^4$
$R^4$ is —H or a $C_1$-$C_6$ alkyl group;
$R^5$ is a $C_1$-$C_6$ alkylene group; and
each y is 0 to 5;
(b) forming a filter cake from the particulates of (i) and (ii) on a formation face of the first zone;
(c) increasing flow resistance of the well treatment fluid within the reservoir by forming a pressure drop through the filter cake; and
(d) re-directing flow of the well treatment fluid away from the first zone and into the second zone.

23. A method of stimulating a subterranean formation penetrated by a reservoir, the method comprising:
(a) pumping into the reservoir a fluid comprising a mixture of particulates comprising:
(i) at least one aliphatic polyester having the general formula of repeating units:

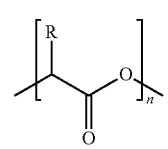

(I)

where n is an integer between 75 and 10,000 and R is selected from the group consisting of hydrogen, alkyl, aryl, alkylaryl, acetyl, heteroatoms, and mixtures thereof; and
(ii) at least one compound of the formula:

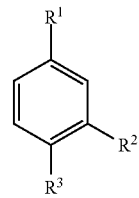

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ and $R^3$ are —COO—$(R^5O)_y$—$R^4$ when $R^1$ is —H and further provided only one of $R^2$ and $R^3$ is —COO—$(R^5O)_y$—$R^4$ when $R^1$ is —COO—$(R^5O)_y$—$R^4$
$R^4$ is —H or a $C_1$-$C_6$ alkyl group;
$R^5$ is a $C_1$-$C_6$ alkylene group; and
each y is 0 to 5;
wherein the fluid is pumped into the reservoir in multiple stages;
(b) forming in a first stage a viscous pill comprising the particulates of (i) and (ii) in a high permeability zone and blocking entry of the well treatment fluid into the high permeability zone;
(c) pumping the well treatment fluid in a second stage into the reservoir and diverting flow of the well treatment fluid of the second stage into a zone of lower permeability than the high permeability zone of step (b); and
(d) successively repeating steps (b) and (c).

* * * * *